United States Patent
Karol et al.

Patent Number: 6,122,275
Date of Patent: Sep. 19, 2000

[54] REAL-TIME PROCESSING FOR VIRTUAL CIRCUITS IN PACKET SWITCHING

[75] Inventors: Mark John Karol, Fair Haven; Sanjoy Paul, Atlantic Highlands; Clark Woodworth, Rumson, all of N.J.

[73] Assignee: Lucent Technologies Inc., Murray Hill, N.J.

[21] Appl. No.: 08/721,423

[22] Filed: Sep. 26, 1996

[51] Int. Cl.$^7$ .................................................. H04J 3/24
[52] U.S. Cl. ............................................................ 370/389
[58] Field of Search ..................................... 370/389, 395, 370/353, 352, 351, 355, 473, 471, 390, 465, 469, 399, 397, 503, 474, 475, 476

[56] References Cited

U.S. PATENT DOCUMENTS

| | | | |
|---|---|---|---|
| 5,509,006 | 4/1996 | Wilford et al. | 370/401 |
| 5,541,927 | 7/1996 | Kristol et al. | 371/32 |
| 5,842,224 | 11/1998 | Fenner | 370/392 |

OTHER PUBLICATIONS

Selected paragraphs in Traffic Management Specification Version 4.0, ATM Forum Technical Committee.
Joyce, F.A., "Telephone and Cable TV: Two Industries or One?" Convergence 93 p. 30 (Chilton Publications).
Rajagopalan, B., "Reliability and Scaling Issues in Multicast Communication," Proceedings of the ACM SIGCOMM, pp. 188–98 (Aug., 1992).
Doeringer, W., et al, "A Survey of Lightweight Transport Protocols for High–Speed Networks," IEEE Transactions on Communication (Nov. 1990).
LaPorta, T.F. and Schwartz, M., "Architectures, Features and Implementation of High Speed Transport Protocols," IEEE Network magazine (May, 1991).
Netravali, A.N., et al, "Design and Implementation of a High Speed Transport Protocol," IEEE Transactions on Communications, vol. 38, No. 11 (Nov., 1990).

*Primary Examiner*—Dang Ton

[57] ABSTRACT

Real-time hardware primitives are added to packet switches to provide efficient support for inward multicasting. The lookup table used for routing is extended by adding additional opcode and operand fields into the routing table and by including ALU circuitry to process these fields and corresponding fields in the arriving cells. Memory word widths can be extended with minimal additional chip count and the ALU can be a small addition in a header processing VLSI, thereby giving only a modest increase in complexity. By including real-time processing in the switch it is possible to solve the ACK implosion problem associated with high-speed reliable multicasting transport protocols. By keeping the primitives as general as possible, other applications can benefit as well from these real-time primitives.

10 Claims, 8 Drawing Sheets

| Opcode | COMMENTS |
|---|---|
| CPYS | COPY STATE (S) |
| CPYI | COPY IMMEDIATE (I) |
| AND | BITWISE BINARY AND (UNIT S & UNIT I) |
| OR | BITWISE BINARY OR (UNIT S \| UINT I) |
| XOR | BITWISE BINARY XOR (UNIT S ^ UNIT I) |
| MINU | MINIMUM OF UNSIGNED (MIN(UNIT S, UNIT I) |
| MINS | MINIMUM IF SIGNED (MIN(INT S, INT I) |
| MAXU | MAXIMUM OF UNSIGNED (MAX(UNIT S, UINT I) |
| MAXS | MAXIMUM OF SIGNED (MAX(INT S, INT I) |
| WAND | WINDOWED AND |
| WOR | WINDOWED OR |
| RSTAS | RESET ARRIVAL STATE |
| CPYAS | SET ARRIVAL STATE AND COPY ARRIVAL STATE TO OUTPUT IF BOTH ARRIVED |
| ADDS | SIGNED 2s COMPLEMENT ADD (INT S + INT I) |
| ADDU | UNSIGNED ADD (UNIT S + UINT I) |
| SUBS | SIGNED 2s COMPLEMENT SUBTRACT *INT S - INT I) |
| SUBU | UNSIGNED SUBTRACT (UINT S - UINT I) |
| MULU | UNSIGNED MULTIPLY (UINT S * UINT I) |
| MULS | SIGNED MULTIPLY (INT S * INT I) |
| DIVU | UNSIGNED DIVIDE (UINT S / UINT I) |
| DIVS | SIGNED DIVIDE (INT S / INT I) |
| SOP | USE DEFAULT STATE OPCODE |
| INC | INCREMENT STATE (UINT S <- UNIT S + 1) |
| CPYSP | COPY PERMISSIONS AND STATUS |

FIG. 5

| BINARY ARRIVAL STATES | COMMENTS |
|---|---|
| NEITHER | NO CELLS HAVE ARRIVED ON EITHER INPUT VCI |
| A_ARRIVED | A CELL HAS ARRIVED ON THE FIRST VCI BUT NOT THE SECOND |
| B_ARRIVED | A CELL HAS ARRIVED ON THE SECOND VCI BUT NOT THE FIRST |
| BOTH_ARRIVED | BOTH INPUT CELLS HAVE ARRIVED |

FIG. 6

| BINARY MODE OPCODE VARIATIONS | COMMENTS |
|---|---|
| DROP_DUP | DROP DUPLICATE CELLS AFTER FIRST ARRIVAL |
| ACCEPT_DUP | LATTER ARRIVALS UPDATE STATE |
| AUTOCLR | AUTOMATICALLY CLEAR ARRIVAL STATE ON SECOND INPUT ARRIVAL |
| MANUALCLR | MANUALLY RESET (RSTAS) ARRIVAL STATE FOR NEXT BINARY OPERATION |

FIG. 7

| STATE ABLE UPDATE MODE | COMMENTS |
|---|---|
| UPDATE | RESULT IS COPIED TO STATE TABLE (S) |
| NOUPDATE | STATE TABLE MAINTAINS PREVIOUS VALUE |
| BINARY | FIRST INPUT LOADS STATE TABLE (SELECTED BY OUTPUT CELL MODE) |

FIG. 8

| OUTPUT CELL MODE | COMMENTS |
|---|---|
| UPDATE | RESULT IS COPIED TO THE OUTPUT CELL(S) |
| BINARY | SECOND INPUT CELL AND STATE UPDATE OUTPUT CELL |
| DELETE | NO CELL IS OUTPUT |
| DEL_ZERO | DELETE CELL IF RESULT IS ZERO ELSE UPDATE AND SEND |
| DEL_NZ | DELETE CELL IF RESULT IS NON-ZERO |
| DEL_NEG | DELETE CELL IF RESULT IS NEGATIVE |
| DEL_NOVF | DELETE CELL IF NO OVERFLOW |
| DEL_POS | DELETE CELL IF RESULT POSITIVE |

FIG. 9

| PERMISSIONS | COMMENTS |
|---|---|
| ALLOWPACKETOPS | PACKETS OPCODES ARE ENABLED |
| NOPACKTOPS | PACKET OPCODES ARE DISABLED AND ONLY SIGNALING OPCODES ALLOWED |

REAL-TIME PROCESSING FOR VIRTUAL CIRCUITS IN PACKET SWITCHING

TECHNICAL FIELD

This invention relates to connection oriented networks and real time processing in packet switches to support high speed multicasting.

BACKGROUND OF THE INVENTION

ATM switches can be classified into three categories: basic switches, smart switches, and intelligent switches. Basic switches perform preliminary switching functions and sometimes operate in the hundreds of Gb/s throughput region with multi-Gb/s port rates. However, they cannot support multicast, transmission from a source host to a selected group of more than one destination hosts, or other special functions, for the reasons discussed below. Many commercially available ATM switches fall into this category. Intelligent switches, on the other hand, suffer from technological limitations associated with being software based, and therefore cannot operate in real time, except for lower-throughput switches. (Routers, most of which operate below 100 Mb/s, are one example of intelligent switches.) ATM switches which fall into the smart switch category, support multicast and broadcast transmission from a source host to all hosts on a specified network. These switches can operate in the tens of Gb/s throughput region with port rates in the hundreds of Mb/s.

There is currently a transition from basic ATM switches toward smarter switches that support multicast, and a transition from intelligent router-like switches toward faster ATM switches that support new high-bandwidth applications with quality-of-service requirements. Furthermore, new TV distribution services are likely to accelerate the transition to smart switches.

To support multicast, a source switch must be able to receive an acknowledgment ("ACK") from each multicast destination switch. Thus to achieve reliable delivery in a multicasting environment the source host must be capable of processing the ACKs for a potentially large number of destinations. When the source system receives more ACKs than it can manage, a situation known as 'ACK implosion' results and system efficiency suffers.

Protocols have been proposed at higher layers, including transport through application levels, that provide processing to support a 'combine function' in which ACKs, for example, are combined logically before being passed to the source application. See for example, U.S. Pat. No. 5,541,927 issued to Kristol et al., on Jul. 30, 1996 which describes a method for a high speed multicast protocol. Typically, the combine function would be located at the branches along the multicast tree so that the source would not be inundated with messages.

While supporting a combine function with software is useful, it is relatively slow. As the hardware integral to multicasting switches can duplicate cells quicker than the software implemented combine function of the prior art, the software solution acts as a bottleneck decreasing the throughout of the multicast connection.

SUMMARY OF THE INVENTION

Accordingly, it is an objective of the present invention to perform the logical combine function at the ATM hardware level within the switch VLSI.

In furtherance of this objective, real time state and combinatorial logic is added to the packet switch hardware at the ATM protocol layer, such that the switches provide general purpose primitives to support applications including signaling, maintenance, wireless networking, games, software distribution, synchronization, telemetry and computing. More respectively, the memory in the VCI lookup table of a packet switch is extended and arithmetic logic unit (ALU) functionality is added to the header processing circuitry to support a packet switch instruction set.

DETAILED DESCRIPTION OF THE INVENTION

In order to access switch primitives, it is assumed that higher-layer protocols in the end system have access to the raw packet switch protocol layer.

Figure 1:
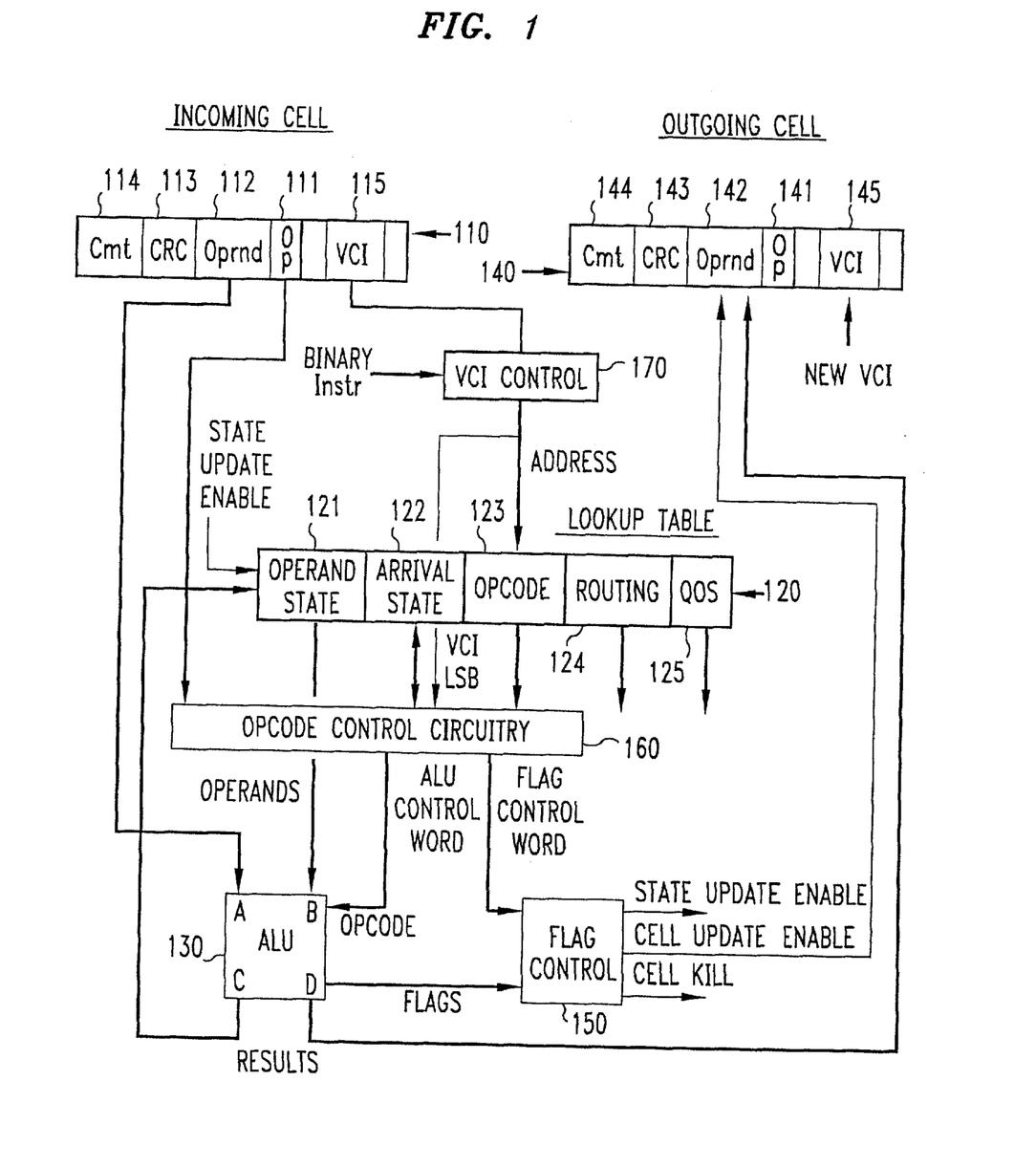
FIG. 1 shows an illustrative architecture for hardware primitives designed in accordance with the principles of the invention.

From here on, the present invention will be described for the specific case of an ATM packet switch. The principles of the invention, however, are equally applicable to non ATM packet switches. Referring to FIG. 1 cells using the primitive services in the switch in accordance with the present invention, have a special format. The data portion of cell 110 contains an opcode field 111, an operand field 112, a CRC field 113, and an optional data (comment) field 114. The opcode found in opcode field 111 specifies the operation to be performed while the operand field 112 may contain one or more pieces of data that may enter the computation. The CRC in CRC field 113 is provided because there is no error protection at the ATM level. A simple CRC calculation is performed over the opcode and operand before completing the calculation. The function is aborted with no change when a CRC error is detected. Cell losses are handled at a higher level and are discussed further below. Based on a control word, the operand state 121 stored in lookup table 120, and operand field 112 of cell 110, a computation is performed in ALU 130 and operand state 121 or operand field 142 in outgoing cell 140, or both, are updated with the result. Specifically, ALU 130 sets and passes flags to flag control unit 150 based on the results of the computation. Depending on the flag control word, outgoing cell 140 may be deleted or updated with the result. The result can also be saved in the operand field 121 of state table 120.

Typical ALU functions include counting, addition, AND, OR, and other specialized functions detailed further below. Note that in addition to operand field 142, outgoing cell 140 includes the same fields as incoming cell 110, namely, opcode field 141, CRC field 143, comment field 144 and VCI field 145.

The opcode entered in ALU 130 can come from one of two sources: the opcode portion 123 of lookup table 120 or opcode field 111 of incoming cell 110. Signaling software is used to update the opcode in lookup table 120 while the opcode in cell 110 is inserted by the virtual channel user. Opcode control circuitry 160 uses lookup table 120 opcode bits or additional permission bits to select whether opcodes will be accepted from incoming cell 110 or whether only the opcodes from lookup table 120 will be used. Once the opcode source has been selected, opcode control circuitry 160 generates the ALU control word that selects the ALU operation and generates the flag control word that selects the flag control function.

In the embodiment illustrated in FIG. 1, it is assumed that the operands to be combined belong to packets having consecutively numbered VCIs.

Since operands are stored in lookup table 120 together with the VCI identifying the packet on which they arrived in the switch, that VCI must be known when the next packet arrives so as to identify and retrieve the stored operand, and perform the combine function. VCI control 170 facilitates this by forcing the least significant digit of the VCI of all incoming packets being combined to the same value, either zero or one. Since two consecutive VCIs differ only in the least significant digit, the VCI control 170 function will always result in the VCI of the operand stored in lookup table 120 allowing it to be retrieved and input to ALU 130. VCI information from VCI field 115 in incoming cell 110, controlled by VCI control 170 may also be used to modify the opcode function and the bits found in arrival state field 122 as described below.

Routing field 124 and Quality-of-Service (QoS) field 125 are used in the traditional fashion in the ATM switch to route and schedule outgoing cell 140 at the appropriate output port of the switch. The translation of VCI field 115 may occur in the output section of the line card of the switch.

The hardware described above can be used to compute functions over cells in a single VCI stream or over cells from multiple VCI streams. When doing unary VCI functions, the operands from one or more cells are used to compute a result. Although some steps can be combined or eliminated, unary VCI functions involve three general steps: initialization, computation, and retrieving the result.

The initialization can be performed at call setup by the signaling software or through cell opcodes, and the initialization is usually a copy of the operand field of the cell to the operand field in the lookup table so that it is set to a known value.

The computation is performed by sending one or more cells to the switch with suitable opcodes and operands. The results of the operations are accumulated in the operand field of the lookup table. Finally, the result accumulated in the operand field of the state table can be copied to the output cell and sent to its destination. Alternatively, the result of each intermediate and the final calculation can be forwarded to the destination during each computation, thereby eliminating the last step.

For example, suppose a dozen nodes that must perform maintenance functions, e.g., distribution of table or software updates, under the control of a network manager. The manager establishes VCI A from each node to a switch and continues the inverse multicast connection from the switch to itself. It also establishes a connection from itself to the switch on VCI A, which it uses to initialize the operand state to 0. On a separate VCI it multicasts the command to have the nodes perform the first maintenance step of the function. On completion, the nodes send a cell on VCI A with the OR opcode and with an operand containing a unary representation of their station id (e.g., station zero sets bit zero, station one sets bit one). After a suitable time period, the manager sends an opcode on VCI A to copy the result to an output cell, which it then receives and uses to verify that all stations have completed the maintenance function. The manager can then take action for any stations that failed to respond, and can then continue with the next maintenance function.

Figure 2:
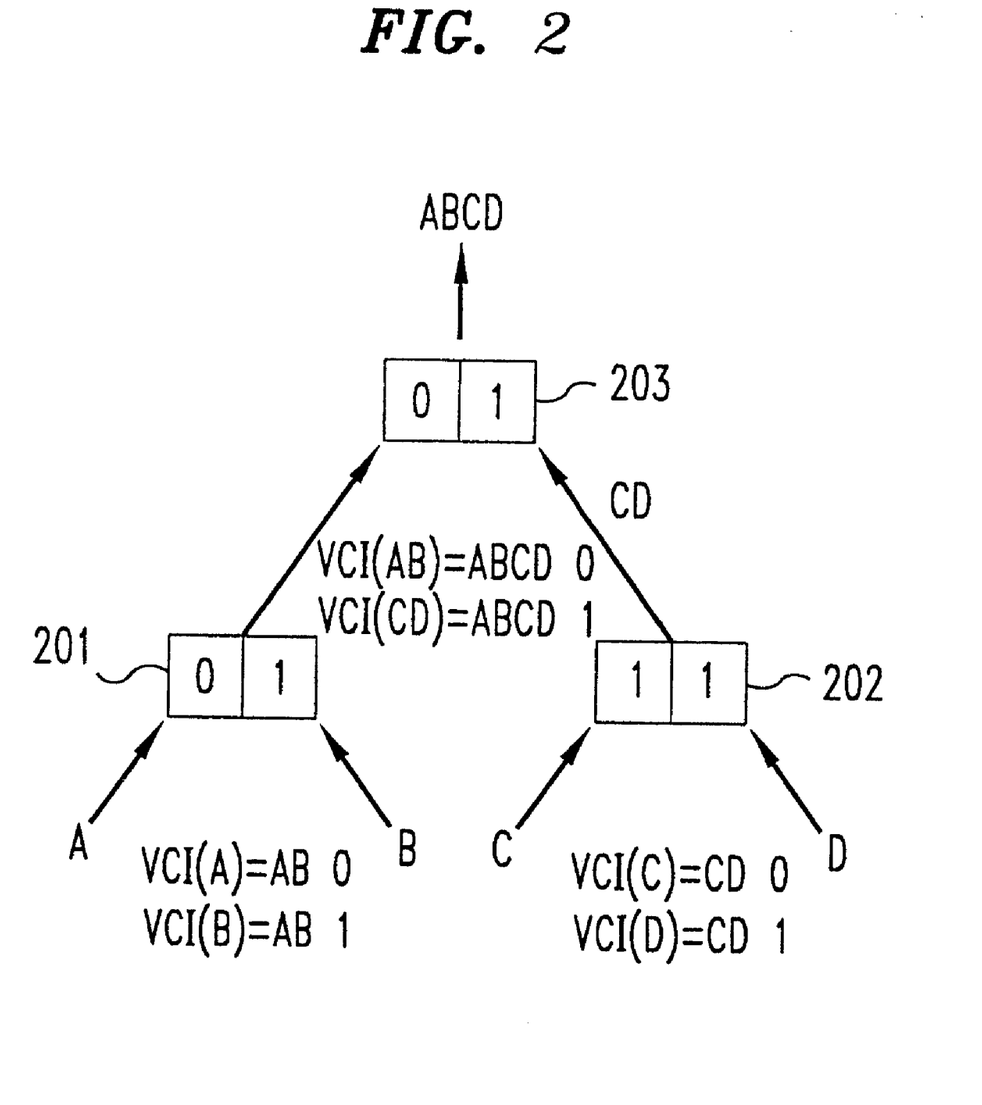
FIG. 2 illustrates a combination of virtual channel identifiers that define a cell stream.

The hardware described above can also be used to compute functions over multiple VCI streams with only a modest increase in complexity. To support an arbitrary number of VCIs in a combine function, it is sufficient to support computation over two streams since larger numbers of streams can be combined using computations on pairs of VCIs in a hierarchical fashion. Referring to FIG. 2 as an illustration, cells from stations A and B are combined in switch 201 while cells from stations C and D are combined in switch 202. Finally, the result from switches 201 and 202 are combined in switch 203. Switch 201 shown with two state arrival fields is set to register an arrival state bit with a value 1 in its right field for the packet from station B, when it arrives, and an arrival state bit with a value 1 in its left field for the packet from station A, when it arrives. A similar set-up is illustrated for switch 202 and switch 203.

To compute a function over more than one VCI, exactly one cell from each VCI is needed. As cells from A and B will arrive sequentially, either 'A, B', 'B, A.', the first cell to arrive must be stored in the state memory and deleted from the output, pending the arrival of the second cell. On arrival of the second cell, the logic function can be computed from the cells from the state table and the operand field of the second cell and the result copied to the outgoing cell.

Care must be taken to prevent an A, A arrival from triggering the outgoing cell. Thus, instead of simply counting the number of cells received, a technique is used to ensure that each cell is from a different station. One advantageous technique assumes that VCI A and VCI B differ only in the Least Significant Bit ("LSB") in other words they are adjacent VCIs, and that during call setup, the ALU is enabled for these two VCIs. As described above, VCI control 170 causes the lookup of operands from both A and B to access the same operand state table by ignoring the VCI LSB. The LSB is used, however, to update a separate two-bit state field on an arrival of a cell. For example, 0,0 indicates no cell has arrived; 1,0 indicates one cell has arrived from A; 0,1 indicates one cell from B; or 1,1 indicates both cells have arrived. When both cells have arrived, the system either disables itself staying in state 1,1 after issuing the combined result, or it issues the result and clears itself to state 0,0 waiting for the next operation. If the system disables itself in the 1,1 state, a separate instruction must be issued (multicast if a hierarchy) to reset the state to 0,0 for the next operation.

If assigning adjacent VCIs is impossible or otherwise impractical common VCIs can be used while ensuring uniqueness of incoming cells with a separate bit in the data field to distinguish between the two incoming cells.

Alternatively, a level of indirection can be added to the operand field, eliminating any special requirements on the VCI relationship (at perhaps a speed penalty). A level of indirection means using a pointer to a table rather than looking up a table directly.

Figure 3:
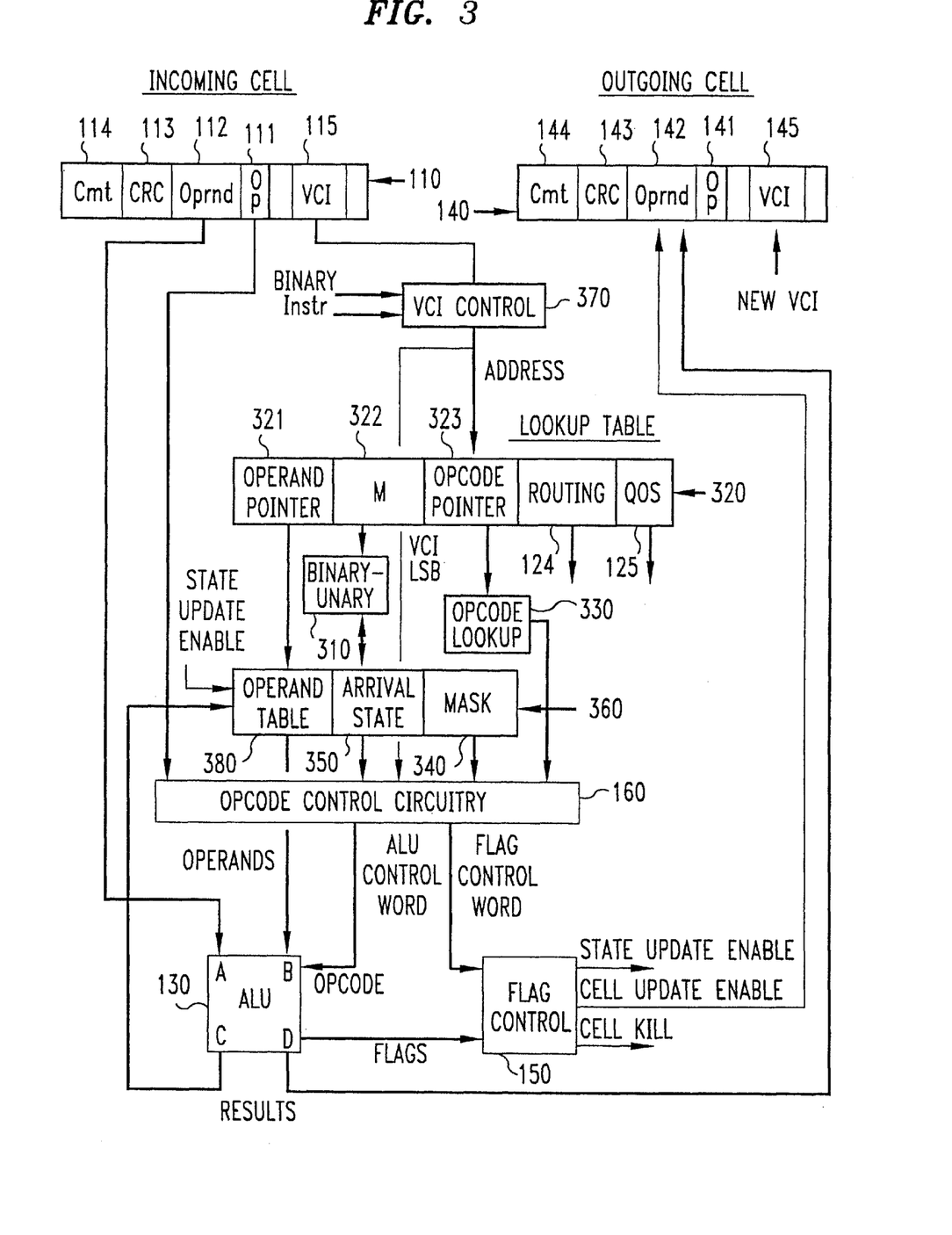
FIG. 3 shows an illustrative hardware architecture in which the operand and opcode fields of a look-up table are replaced with an operand pointer to a separate operand table and an opcode pointer to a separate opcode table, respectively.

Referring to FIG. 3, replacing the operand field 121 of lookup table 120 with an operand pointer 321 to a separate operand lookup table 360 which includes an operand field 380 shown. At connection setup time, signaling software sets a pointer in the two lookup-table VCIs of interest to point to the same free location in operand field 380. The signaling software marks that operand field entry as in-use and manages it as a resource. All reads and writes on operand field 121 in lookup table 120 discussed above now use operand field 380. Although potentially slower because of the second lookup, this allows any pair of VCIs, including non-adjacent pairs, to be combined in a binary fashion, without having to force the VCIs to the same value.

The extra level of indirection can reduce the total amount of memory needed to support these functions when the majority of the virtual channels do not use the ALU. The indirection reduces the VCI operand table 320 to a few pointer bits in pointer field 321. More specifically, if $C_{max}$ is the maximum number of active VCIs using the ALU, $V_{max}$ the maximum number of active VCIs, $M_{max}$ the maximum number of VCIs in a combine function, and $O_{size}$ the operand size, the size of the pointer field 321 in the VCI lookup table 320 is $V_{max} \bullet [\log_2 C_{max} + \log_2 M_{max}]$ log rounded up to the next highest integer, and the size of the operand lookup table 360 is $C_{max} \bullet [O_{size} + 2M_{max}]$. The original contiguous VCI approach, assuming it was generalized to $M_{max}$ VCIs, would have required $V_{max} \bullet (O_{size} + 2M_{max})$ For $V_{max}$ much greater than $C_{max}$, using the contiguous VCI approach requires many more active VCI's than with the pointer field approach, especially for large $M_{max}$.

By including the opcode field in lookup table 360, additional space can be saved. However, if the operand field remains in the VCI lookup table 320, separate VCIs can have separate instructions associated with them providing further programming flexibility. It is also possible to add a level of indirection to the opcode field using opcode pointer 323 and opcode lookup 330 which would enable separate VCIs to have different operands and permissions while also reducing the total memory requirements to $C_{max} \bullet O_{size}$ from $V_{max} \bullet O_{size}$ without indirection. Note, this would be advantageous if the number of possible instructions is greater than the number of active VCIs.

To extend the combine function over multiple VCIs, arrival state 350, previously shown as part of lookup table 120 and modified by opcode control circuitry 160, is included in the operand lookup table 360. A small integer descriptor numbered sequentially in binary is uniquely identified with each VCI associated with the combine function. When cell 110 arrives, the binary integer descriptor M is obtained from field 322 of lookup table 320, converted to a unary number in binary-unary unit 310, and used to update arrival state field 350 in the operand lookup table 360 by indicating which cell has arrived. When the arrival state contains all zeros, no cells have arrived and the currently arriving cell must copy its operand to operand field 380. When some, but not all of the cells have arrived, the operand from cell 110 must be combined with the operand in operand field 380 and written back to operand field 380. When the final cell arrives, all ones in arrival state field 350, for example, the cell and operand fields 112 and 380, respectively, are combined and the result written into operand field 142 of outgoing cell 140. The no-arrival state and final-arrival state can be decoded with NOR and AND gates, respectively.

When the hardware supports multiple-VCI combines, the hardware may support more VCI streams in a combine than a given application needs. Suitable masking or maximum VCI count information must also be stored in mask block 340 of lookup table 360 at call setup so that the hardware knows how to compute the final-arrival state. The mask field 340 indicates the number of cells to be combined. This is done by stripping off a number of arrival state bits from the maximum number of cells that the switch can combine until the number of remaining bits correspond to the number of cells that need to be combined. A binary-to-unary conversion of the unused VCIs can be used to generate a mask that can be OR'ed with the arrival status for proper operation in these cases.

Referring to FIGS. 4 through 9 a proposed instruction set for a smart switch, instruction operations and a summary of their actions are shown. The notation S refers to the contents of the state operand field stored for a given VCI. The notation I is the contents of the immediate operand field following the instruction opcode in an incoming cell. The destination of these operations will be discussed shortly. All arithmetic operations set flag bits that can participate in conditional operations. The SOP opcode specifies that the opcode inserted into the opcode portion of the state table be used instead of the opcode found in the incoming cell. The operands can be either integer (int) or unsigned integer (uint).

The arithmetic operations above can be used to combine the contents of two cells from different VCIs to form a result. In general, where N cells are to be combined the operation is referred to as N-ARY. Where two cells are to be combined, the switch is said to be in BINARY mode. BINARY mode operation requires that the information from each cell arrive together and be combined. Since it is not likely that two sources will be synchronized so that their cells arrive at a packet switch together, as explained above, the state from the cell that arrives first is stored in S while the second arrival causes the computation using the stored value S and the immediate value I from the operand field of the cell. State bits as listed in FIG. 5 track the arrival state 122 of the connections for the binary combine operations of FIG. 1 or N-ARY combine operations of FIG. 3.

In the N-ARY mode, the opcode functions can be modified by control bits. The control bits can be part of the opcode of the incoming cell or can be saved as part of the state register by signaling software or by a CPY instruction. One bit determines the disposition of a second cell arrival on one input as in a second A cell, before any B cells are received. S can either be updated with the duplicate cell, or the duplicate cell can be dropped.

Figure 4:
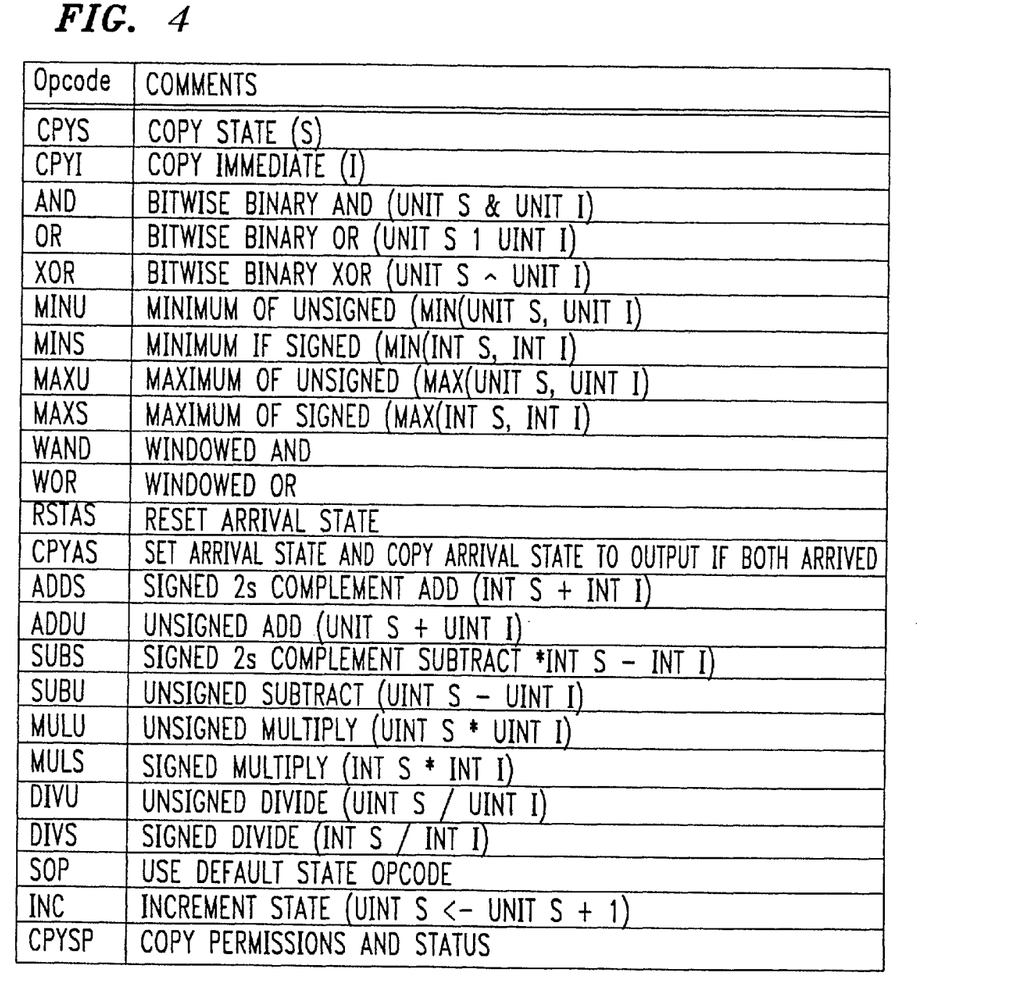
FIGS. 4 to 9 show instruction sets and instruction set fields, that are executed by the processor of a packet switching system to implement the principles of the invention.
Figure 5:
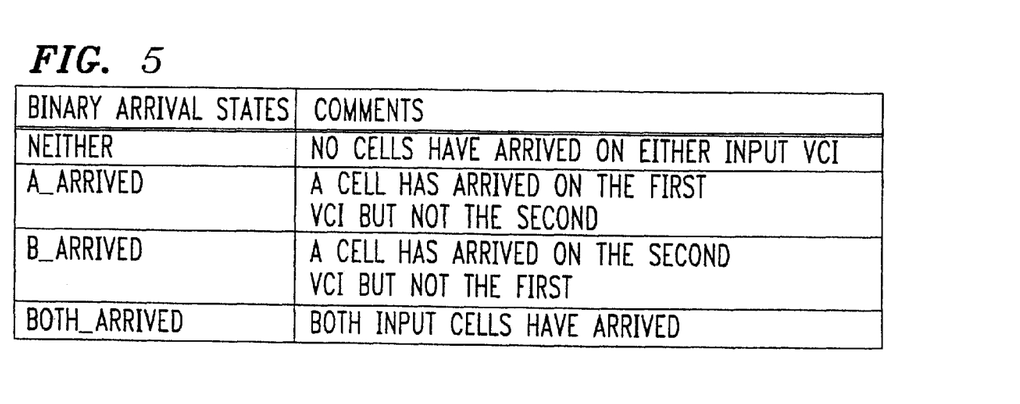
Figure 6:
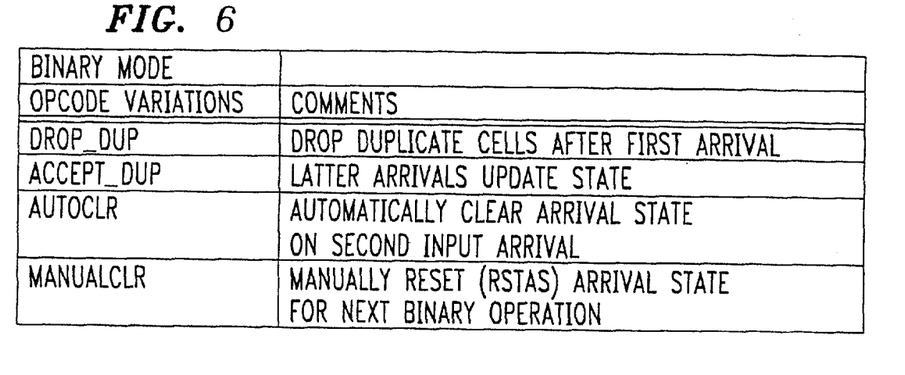

As shown in FIG. 6, upon the arrival of a cell at each of the two inputs, the arrival state can automatically switch from the BOTH_ARRIVED state to NEITHER state allowing the next round of BINARY combination to occur or it can stay in the BOTH_ARRIVED state until an RSTAS instruction listed in FIG. 4, is received and the arrival states are reset. In some applications, it is desireable to clear a state and prepare to receive new information. This is referred to as endpoint synchronization. Using an RSTAS function allows for endpoint synchronization.

Figure 7:
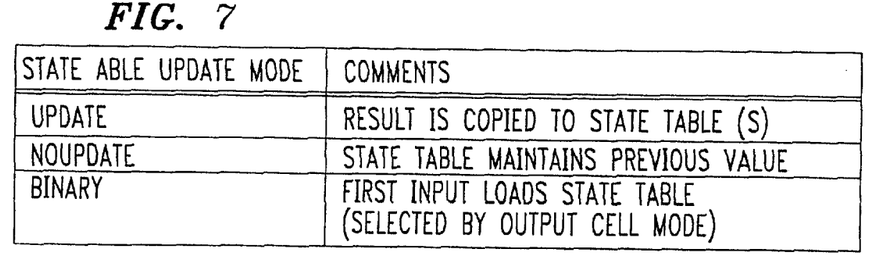
Figure 8:
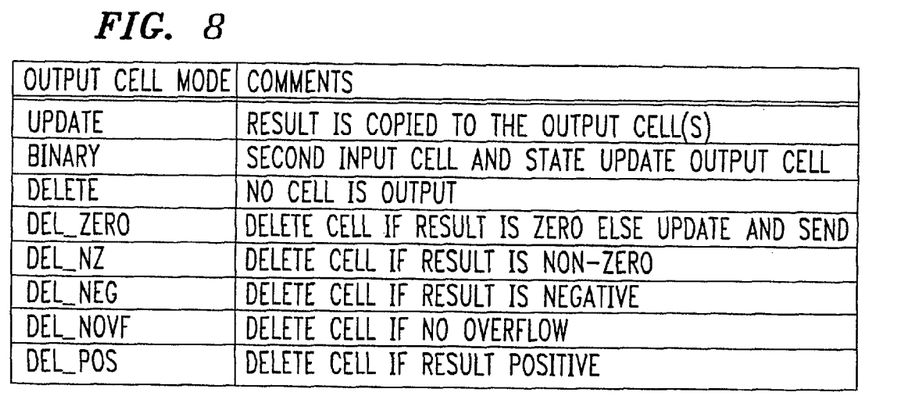
Figure 9:
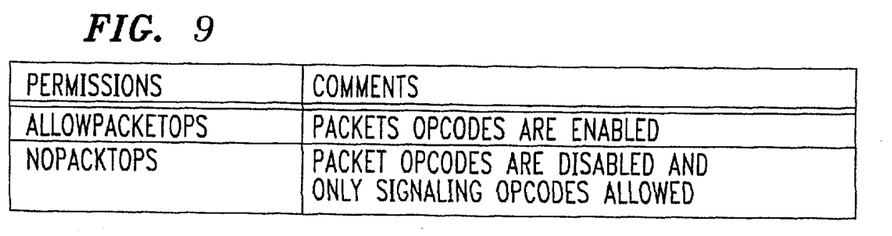

Referring to FIG. 7, a single bit can be included in the opcode field to specify that the result of a non BINARY mode ALU operation be used to update the state table. In BINARY mode, the state table must be loaded on the first arrival and will be overwritten in later rounds.

Additional bits in the opcode field can specify whether the operation is in the BINARY mode and determine whether an output cell is generated. Based on the result of flags from arithmetic operations, an output cell can be conditionally generated with the result, as specified in FIG. 8.

For security reasons, it may be important to limit the use of arbitrary opcodes and allow only cell operand data to be supplied. In this case, the signaling channel can store an opcode into the state memory, and the security state can be set through the signaling channel as in FIG. 9. When cell opcodes are permitted, the state opcode instruction (SOP) selects the default opcode. When cell opcodes are not allowed, the opcode field is ignored and the opcode stored in the state table of FIG. 7 is always used. For the INC instruction, none of the fields of the cell are used if cell opcodes are disabled. Thus, it can be used as a cell counter that could be useful for billing by deleting the output cell except for on overflow.

The foregoing list of operations is intended only for illustration. It is understood that use of the opcodes or modes given above or additional opcodes or modes not given above, depend on the particular application. Additional instructions which may be useful include: conditional operations; logical and arithmetic shift instructions; floating point support; billing support instructions; a binary mode instruction that concatenates subfields of the operand fields of the two cells. Additional instructions could access or combine data corresponding to the internal switch state other than data from the state table, e.g., queue length, with packet data and modify the internal state, e.g., switch service policy, directly or conditionally.

The general idea of cell-based ALU computation is illustrated below by way of an example drawn from the field of transport protocols. Although cell based ALU computation is more than a mechanism for implementing a specific transport protocol or for protocols in general, protocols are as natural a use of the cell-based computation as number crunching has been to mainframes. But, much as mainframes support databases, games, graphics and interactive computing the network ALU units described herein have a general utility as discussed further below. One important application of the primitives discussed above is support of reliable multicasting protocols as discussed below.

To solve the ACK implosion problem discussed in the background section of this application, a hierarchy of local processing nodes perform a combine function in accordance with the present invention. The primitives discussed above are included in the hardware of a packet switch and the combine function is executed in real time obviating the need to go up and back down the protocol stack at the intermediate combining switch centers. By associating the combine function within the multicasting switches, the combine function can be applied at the branches of the multicast tree where it will be most effective. Implementation in hardware allows high throughout and low delay by processing the cells in real time.

In one embodiment of the present invention, the high speed multicast protocol described in U.S. Pat. No. 5,541,927 can be implemented with the hardware primitives of the present invention for real time switching application. As applied to supporting multicast, a hierarchical combine tree is established at call setup time to transmit the ACKs from all multicast receivers to the switch ALU units where they are combined pairwise using a binary combine function as described above until eventually a single summary cell is available for transmission to the source. Where the ACK state information is transmitted independently and periodically by each multicast receiver, no special synchronization is needed between the ACK streams. Thus the self-clearing binary mode where the ALU resets itself for the next cell from each input VCI as soon as it has computed and sent the current result from the two most recent pairs can be used. This enables the pipeline to remain full and avoids the need to reset the state of the tree after each ACK. Because the transmission of state information from each source is independent and at nominally the same rate, the stored state can be updated with the more recent state whenever duplicate cells arrive on a given input port, thus entering the most current status of the ACK state into the computation.

Where one of the cells from a source is lost because of a bit error or due to congestion, the combined result never gets transmitted to the source until the next period when the periodic status from the missing cell is retransmitted completing the arguments for the combine function. This will cause a time skew in the combined status information to the source. For example, if A, B, and C arrive and D is lost, no combined cell is generated. Later, if the cells from the subsequent periodic transmission arrive in the sequence A, B, D, C, then the result ABCD will be generated following the arrival of D using the old status of C. This means that the new status from C will not be looked at until the next combine function. Further, if C is always last, perhaps because it has the longest path, then its status will always be late by one periodic status interval.

In this embodiment, this is acceptable since there are many periodic status transmissions in one round-trip window and since duplicate arrivals from the same station simply update the state. In this embodiment, each receiver periodically transmits its state based on its own clock. Therefore, although periodic transmissions may all occur at a nominal rate, they are not synchronized and the phases of their transmissions will slide through each other. Thus, any skews built up as a result of a lost cell as outlined above will quickly dissipate and status updates will remain within a few periodic transmission intervals of each other.

In another embodiment of the present invention as applied to supporting multicast, missing cells can be deleted from a combine function. A source can initiate, with a multicast, the transition from the disabled 1,1 state to the enabled 0,0 state while notifying each station with the comment field of the same cell to transmit their status. The source station can quickly detect cell loss when the combine packet doesn't arrive within a specified period of time.

However, only limited pipelining can be achieved using this method making its use with long round trip delays slower than the method outlined above.

Figure 10:
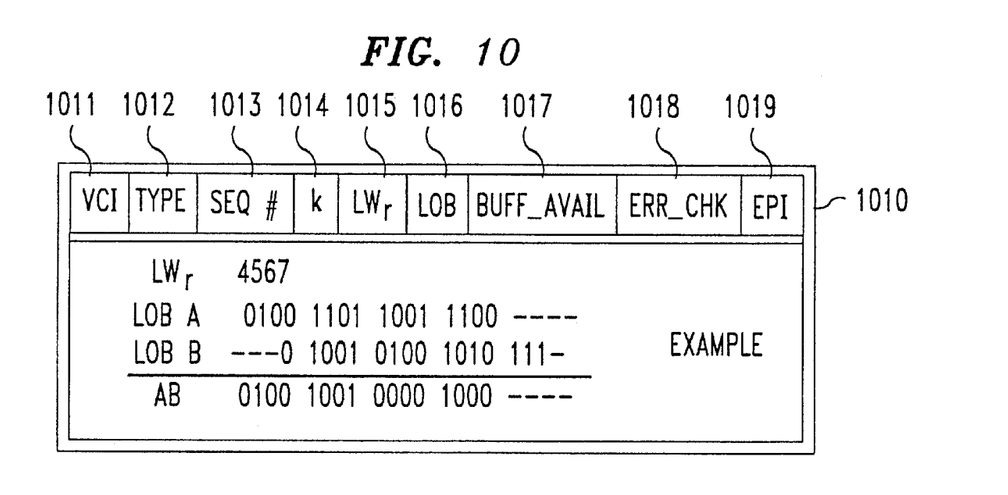
FIG. 10 shows the respective format of illustrative status packets periodically broadcast from each multicast destination.

Referring to FIG. 10 the format of status cell 1010 periodically broadcast from each multicast destination is shown. Herein "destination" refers to the destination of the original data cell. The multicast destinations are actually the source of status cell 1010 to be combined and sent to the source of the original data cell. A description of the fields of status cell 1010 can be found in U.S. Pat. No. 5,541,927 hereby incorporated by reference as if fully set forth herein. With respect to the computation and combine functions in the ATM switches, the VCI, SEQ, K, Error Check and EPI fields 1011, 1012, 1013, 1014, 1018 and 1019, respectively, can be treated as comments.

Buff_Avail field 1017 of status cell 1010 is transmitted by each destination. To prevent buffer overrun, the source needs the minimum of this field over all destinations. List of Outstanding Blocks ("LOB") field 1016 is a bitmap of the data blocks successfully received at the destination, while $LW_r$ field 1015 gives the block number of the LSB of the LOB field 1016. In other words, $LW_r$ 1015 anchors the bitmap and gives the first block number not yet successfully received.

The source uses this information to determine which blocks to selectively retransmit and to adjust its transmission rate. The multicast branches must combine the LOB bitmaps in such a way that it has the AND (assuming 0 represents 'not received' and 1 represents 'received') of each of the LOBs properly shifted such that the bit maps are aligned with the first bit of each LOB having the same block number. Variations on the protocol replace AND with the OR function.

Since an ATM cell is small and the operand field that can participate in the combine function is only a few bytes, each independent field may preferably be carried on separate streams. Since Buff_Avail field 1017 is logically independent of LOB 1016, Buff_Avail cells travel on a VCI different from the LOB combine function. LOB field 1016, however, is not independent of $LW_r$ field 1015. Note that with protocols where suitable coordination in time exists, this can be relaxed and the same VCIs can be used for multiple combines.

The ALU primitives described above can be used to compute the MIN function over all status cells from the destination hosts. Using the hierarchical tree discussed above, each destination transmits its Buff_Avail field as an operand. The first arrival of each pair gets stored in a switch state table while the second cell causes the minimum of the stored and received operand to be transmitted to the next level in the tree. The source will receive the minimum over all destinations.

As mentioned above, $LW_r$ field 1015 and LOB field 1016 are not independent and must be transmitted together. In fact, $LW_r$ indicates the starting position of LOB. For example, if the value in $LW_r$ field 1015 is 123 and LOB 1016 contains 01011100, the indication is that blocks 123, 125, 129 and 130 have not been received, where the bitmap in LOB corresponds to increasing block numbers from left to right. Thus, if there are two status messages with different $LW_r$s, the LOBs need to be aligned by shifting one of them as many positions to the left, or right if the LOBs need to be ORed, as the difference between the $LW_r$S.

The LOBs can be combined in hardware as follows: First, the ALU operand and opcode fields are extended to handle large multi-field operands. The opcode function to perform the combine function includes taking the difference between the $LW_r$ fields 1015 of the respective cells and shifting one or both of the respective LOB fields 1016 until they are aligned. Next, the respective LOB fields 1016 are ANDed. The ANDing result is transported with the smaller of the two respective $LW_r$ fields 1015.

Figure 11:
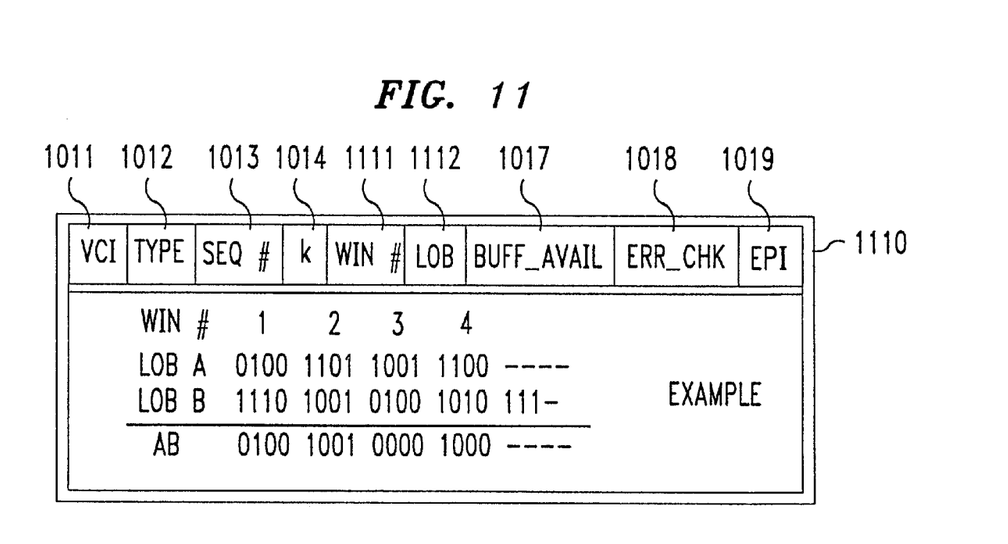
FIG. 11 illustrates a modified status packet designed to simplify opcode computations.

Alternatively, to reduce the hardware complexity, a simple modification of the combine function of the protocol without affecting its correct operation is possible. Referring to FIG. 11, LOB 1016 is divided into a plurality of equal size windows. For example, if the LOB is 64 bits and a window is 4 bits, there are 16 windows. The first window in a LOB is denoted by Win # field 1111. Thus, $LW_r$ 1015 is effectively replaced with Win #1111. Using Win #1111 results in an integer representation requiring less bits than $LW_r$ field 1015. Now, instead of transmitting $LW_r$ and LOBs starting from the $LW_r$, Win # and LOB blocks are transmitted with fixed boundaries. Note that two status messages can have the same Win # but not necessarily the same $LW_r$. In fact, if the window size is $\Delta$, the $LW_r$s in the two status messages may vary by as much as $\Delta-1$ but still have the same Win #. Thus, if there are two status messages with the same Win # (but different $LW_r$), the LOBs can be directly ANDed without any shifting, which would be necessary if the alignment were done based on $LW_r$s as in the original protocol.

Considering this combine function in more detail, each destination host is expected to transmit the Win # field 1111 and the bitmap of the corresponding window in each cell. When one window on the LOB bitmap is completed (all 1s), the destination advances to and transmits the next window. The combine opcode first compares the Win #s, and the LOB of the smaller Win # together with the Win # is copied to the result cell. If the Win #s are equal, then the Win # and the AND of the two LOBs are copied to the result cell.

As an illustration, suppose the size of LOB 1112 is 16, the size of a window is 4, $LW_r$s for two destinations A and B are 4 and 7, respectively, and the LOBs for A and B are, respectively, 0100 1101 1001 1100 and 01001 0100 1010 111. A gives the LOB for blocks between 4 and 19 and B gives the LOB for blocks between 7 and 22. If we combine them using the original protocol, LOB of B would be aligned with that of A by shifting its LOB 3 bits to the right and then ANDed to produce 0100 1001 0000 1000 and the combined $LW_r$ would be 4 (minimum of the two $LW_r$s).

Using Win # for both A and B the Win # is 1 since Win # 0 extends from 0–3 and Win # 1 corresponds to blocks 4–7, and the LOB transmitted would be 0100 1101 1001 1100 and 1110 1001 0100 1010, respectively. Note that the three left-most bits of the LOB of B are 1s, indicating that B has received blocks 4, 5, and 6. Since the Win # is the same, the combine function will simply AND the bitmaps, resulting in 0100 1001 0000 1000, which is exactly the same as in the original protocol. The combined Win # will be 1. However, the new scheme will produce slightly worse results if the $LW_r$S of A and B belong to different windows. For example, if the $LW_r$s of A and B are 7 (Win #=1) and 9 (Win #=2), respectively, then the original protocol will produce a combined LOB starting from combined $LW_r$=7 (the minimum of the two $LW_r$S), while the new scheme will produce a combined LOB starting from Win #=1 (minimum of the two Win #s). However, Win #=1 corresponds to $LW_r$=4 and thus the combined LOB obtained by the new scheme contains some stale results.

Figure 12A:
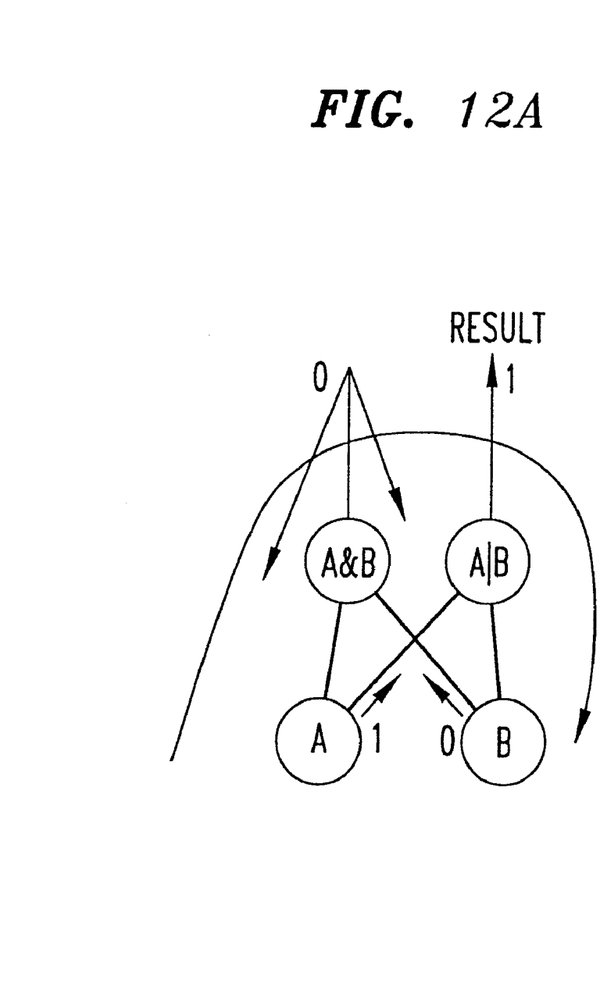
FIGS. 12A and 12B illustrate binary computations performed on status packets to support retransmission in a packet switching system implementing the principles of the invention.

Referring to FIG. 12A, as in the combined protocol described in U.S. Pat. No. 5,541,927, it is possible for stations to locally exchange status information and retransmit lost cells to those local stations that didn't successfully receive them, thereby reducing the overhead of retransmissions from the source. This can be achieved by multicasting the AND of the combined result from the combining switch back to the destinations while sending the OR of the result up the multicast tree. The node that successfully received the data will retransmit it to the other station(s) when it sees the multicast AND status cell with a zero value.

Figure 12B:
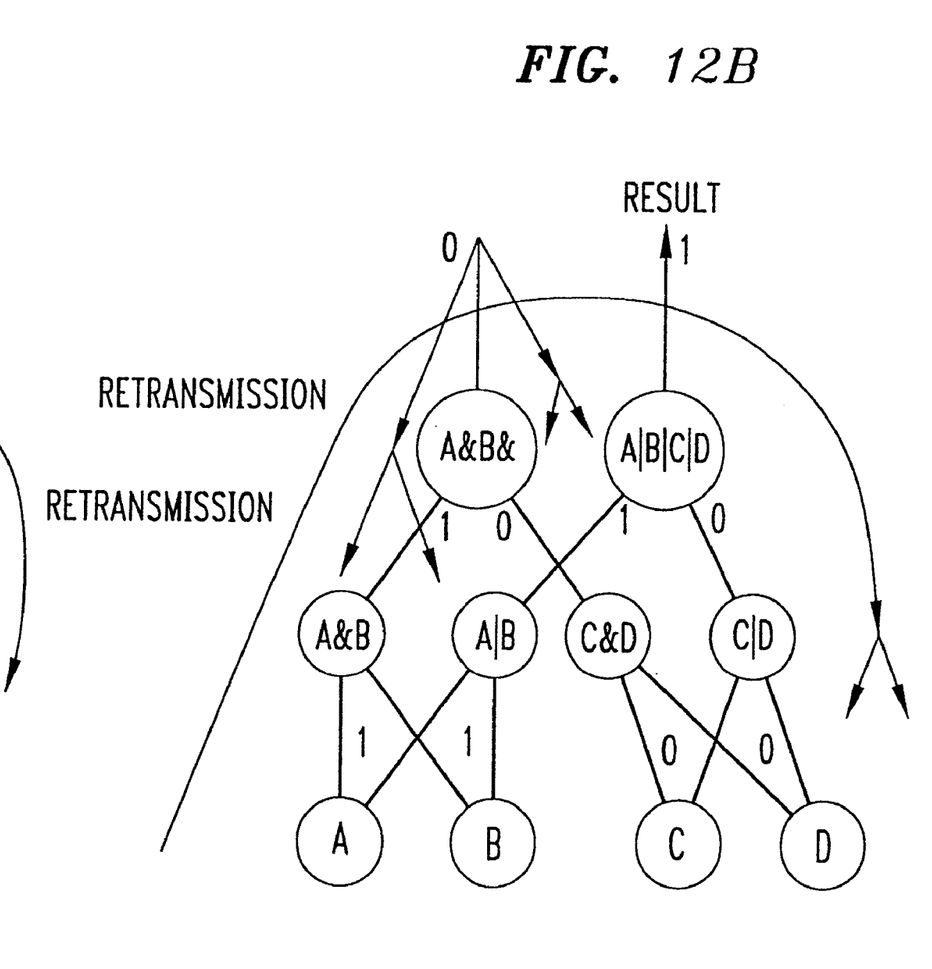

Referring to FIG. 12B, it may also happen that none of the destinations on one side of a sub-tree of the multicast tree receive a cell while some destinations on the other side of the sub-tree receive it. For example, if switches A and B received the cell in question but switches C and D have not, one of the destinations that received the cell, such as A, can multicast the cell locally to the destinations on the other side of the sub-tree, such as C and D. At levels closer to the source, it may be preferable to retransmit from the source rather than from a receiving switch, particularly when the multicast tree has a wide geographic diameter.

In addition to supporting high-performance, high-speed, multicast transport-layer protocols as shown above with the support of a special opcode to handle the dependency of the Win # and LOB fields, general-purpose primitives like MAX, MIN, OR, AND, SUM, INC, etc. can handle many protocols. Standard go-back-N protocols where N packets prior to a presently received packet are retransmitted upon receipt of a negatice acknowledgment ("NACK") message stating the present packet is in error are easily implemented using the MIN function on the last-received packet number. Retransmissions among local destinations as described above also apply to selective repeat where only the packets in error are retransmitted.

Figure 13:
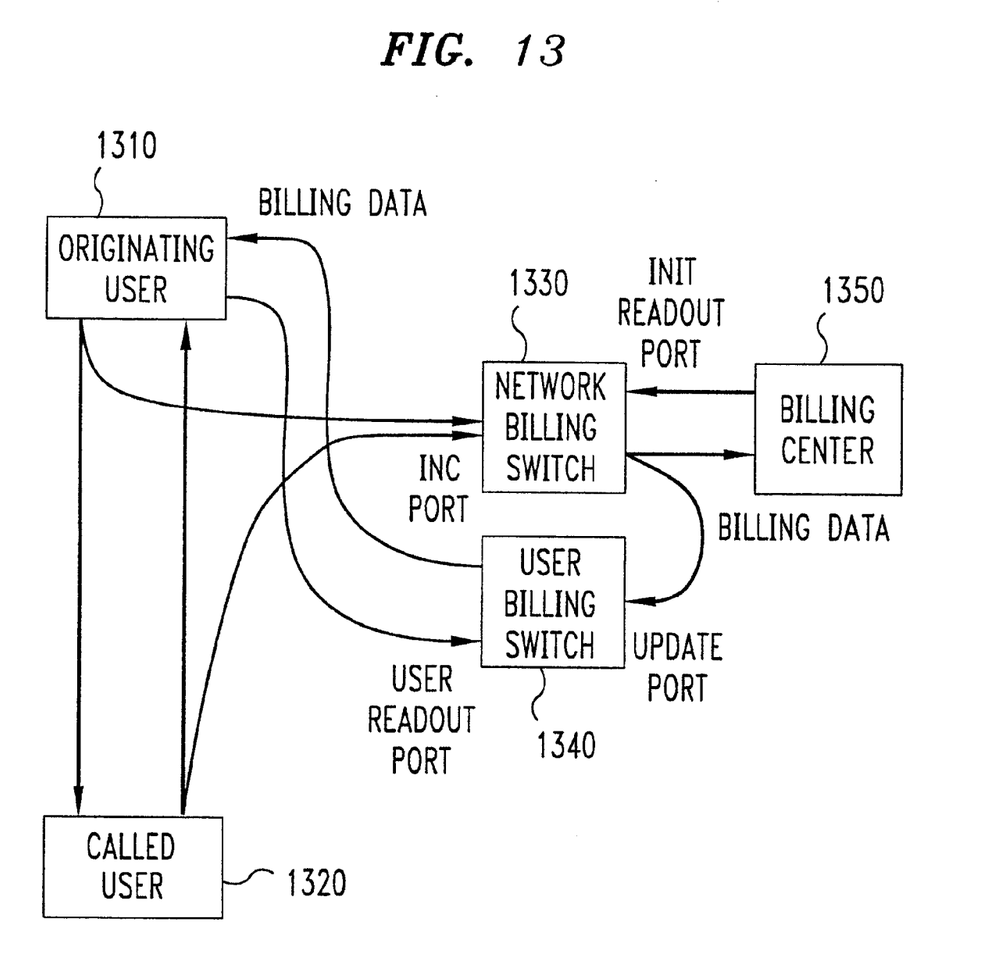
FIG. 13 illustrates a switch architecture using the primitives of the present invention to implement a billing application.

Billing, i.e., tallying the amount of network resources expended by a VCI is another illustrative application for the ALU-based switch of the present invention. Referring to FIG. 13, on call setup, a user's cell stream from originating user 1310 to called user 1320 is multicast to a network billing switch 1330 implementing the primitives of the present invention. For the billing application, it is advantageous to set the state table opcode for delete on no overflow INC with DEL_NOVF with permissions NOPACKETOPS. Each cell of the originating user's data, which can be arbitrary, increments the state S and is deleted. Upon overflow, a cell is copied out of the ALU of switch 1330 and sent to centralized computers 1350 that can tally this slower-rate signal easily. For reliability, the stream could be multicast to several locations, thereby increasing the redundancy.

Another method of billing would be to poll and reset the state periodically. This could be accomplished through the signaling network by suitably modifying the state opcode.

Binary mode billing instructions could offer very powerful methods for computing and summarizing billing information for both the provider and the user. A new binary instruction that would not need synchronization could operate so that cells entering one 'protected' port would increment the state while cells in a second 'secure' port would trigger a readout of the state. Alternatively, the existing opcodes can provide this capability if modification in the hardware extensions section that allows separate opcodes to be associated with different VCIs are made available.

A central billing server could multicast a readout-trigger cell to a group of counters, perhaps belonging to one account, and receive the summarized results in return. These results could also be made available to the user through user billing switch 1340 which acts as a user readout port. The network writes the billing information into another node's operand state table using CPYI while the user can read that operand state table with a CPYS command. The user could also trash the operand state table, but that would not be too useful and would not hurt the network's billing operations.

The foregoing assumed no synchronization between cells from different stations to be combined at a packet switch in accordance with the present invention. Some protocols however, require synchronization or timeouts. Where this is the case, timeouts can be implemented at the source station by transmitting a cell after a predefined time, to flush the state of a combine up to that time. The timeouts are implemented at the source station because it may not be practical to maintain timers for each VCI at the switch and to invoke operations including cell transmissions upon expiration of the timer. Instead, the host at the root of a multicast tree can maintain a timer and trigger events in the switch by sending a cell with a suitable opcode and VCI to the switch to flush the state by causing the switch to issue a cell computed from the saved state. This is useful for counting the cell arrivals in an interval, for example. It may be possible to have, for example, a state machine cycle through all of the state memory space testing or decrementing locations marked as timed. And, in some architectures it may not be unreasonable to queue a cell for transmission. However, the ALU or other logic would have to generate the CRC and pad out the cell while handling all current traffic.

Synchronization is fundamental to many applications and the methods presented herein are useful in a wider context. The binary tree as described in the protocol example above offers one method of synchronizing single cells. Another method generates the differences between two streams with the CPYAS (set arrival state and copy arrival state to output if both arrived) in self-clearing mode. The cells in the difference stream specify which cell of the two streams arrived first and can be used as source feedback, as in a phased locked loop, to align one stream with another.

Multiple sources can send cells on a VCI with an AND opcode and an all 1s operand field except for a zero bit whose position represents the source identification. The state in the switch will be all zero when all sources have sent their cells and the result is multicast back to all source hosts. To manage the case of lost cells, each source periodically repeats transmissions until they receive the multicast reply. At that point, all source hosts announce that they have reached their synchronization point.

Network management is another application that can take advantage of the combination of status messages within a switch. One important function of network management is called Fault management, in which the Network Manager ("NM") tries to locate a faulty element in the network. Fault location can be done in several ways. For example, the network manager may collect status from all the network elements at regular intervals and analyze them or let the network elements inform the NM only when there is a fault in the network. Consider the first case in which each network element sends its status periodically to the NM. In this case, if our scheme for combining status messages at a switch is applied, the NM would receive a single combined status message from the distributed resources that it is managing. Each distributed resource would transmit a '1' when it is operational and a '0' when it is unavailable. The combined AND is transmitted to the NM. If the NM receives a '0', a fault location algorithm is triggered.

In some cases the resource could fail completely, e.g. due to fire, earthquake, or loss of battery power, and no status information would be transmitted by that resource. As a result, the NM would not receive a status message. In that case, a binary search of the tree can be performed to locate the missing status cell. This can be achieved by sending a test status message from the NM to each input at the level in question. The combined state will be released to the NM if the test status cell enters the port on the side of the tree associated with the failure but will not be released if it enters the operational side of the tree.

In each of the above two network management cases, the NM has to explicitly search for the failed network element. It would be quite efficient if the NM is informed not only of a failure but also the identity of the failed element at the same time so that the NM does not have to trigger a fault location algorithm explicitly. This can be accomplished with a simple variation in the framework of our architecture. The modified scheme can be described as follows. Consider an intermediate node combining the status of two network elements A and B. If the element B is down, it will not send its status to the intermediate node. However, A will periodically send its status. The state in the lookup table of the switch (corresponding to the intermediate node) can keep a count of successive status messages from A and send out a cell containing the ID of B in the comment field of the cell when the count exceeds a certain threshold. In this way, the NM will not only be informed of a failure in the network but it will also know the ID of the failed element in the network.

Another application of the present invention is bridging. For example, each voice sample in a data stream can be transmitted on a VCI with the sample data contained in the operand field. The switch can then compute an addition over the samples from different users and output the sum to all users, i.e., giving the bridged voice output.

Not only can applications take advantage of the smart switches of the present invention, but as evident from the examples above, it is possible to program an ATM network to perform computations and solve a class of problems including feed-forward logic and arithmetic. Augmenting the instruction set, with floating point numbers for example, could extend this class to signal-processing-like algorithms or simulations running with end points doing the programming, clocking, and collection of results. Embedding these tools into distributed applications opens up even further possibilities.

What has been described is merely illustrative of the application of the principles of the present invention. Other arrangements and methods can be implemented by those skilled in the art without departing from the spirit and scope of the present invention. In particular, although described in the context of ATM, the present invention is equally suitable for implementation on many non-ATM packet switches as well.

What is claimed is:

1. A packet switch for real time processing of incoming and outgoing packets, comprising:

means for identifying data from each of a plurality of incoming packets, said identified data to be used in a combine function to be performed in real-time at said packet switch;

an arithmetic logic unit included within said packet switch which selects a particular combine function from a plurality of available combine functions, and performs said combine function on said identified data; and means for inserting a result of said combine function in an outgoing packet.

2. A packet switch according to claim 1 further comprising a state lookup table for accumulating the result of said selected combine function until said result is to be inserted into said outgoing packet.

3. A packet switch according to claim 1 wherein said means for selecting a combine function includes means for generating an arithmetic algorithm control word for selecting a combine function and means for generating a flag control word for determining whether said outgoing packet is to be deleted or updated with said result of said selected combine function.

4. A method for real-time processing of incoming and outgoing packets in a packet switch, said method comprising the steps of:

identifying data from each of a plurality of incoming packets, said identified data to be used in a combine function to be performed in real-time at said packet switch;

utilizing an arithmetic logic unit to select a particular combine function from a plurality of available combine functions, and to perform said combine function on said identified data; and inserting a result of said combine function in an outgoing packet.

5. A method according to claim 4 wherein each of said plurality of incoming packets originate from a multicast receiver, or the combined result of a plurality of transmissions from a plurality of multicast receivers, said incoming packets including data reflecting an acknowledgment state to a multicast transmitter, and said outgoing packet including data reflecting the combined acknowledgment states of said multicast receivers and transmitted to said multicast transmitter.

6. A packet switch comprising:

means, responsive to receipt of each of a plurality of incoming packets, for identifying data contained in said packet, said identified data specifying one of a plurality of different combine functions to be performed by said packet switch; and an arithmetic logic unit operative within said packet switch for performing said combine function.

7. The packet switch of claim 6 wherein said data is an opcode and said plurality of different functions are defined by respective opcodes.

8. The packet switch of claim 7 wherein said packet comprises a header and a payload and wherein said data is contained in a respective field of said payload.

9. The packet switch of claim 6 wherein said combined function is applied to other data also contained in said incoming packet.

10. The packet switch of claim 6 wherein said combine functions is applied to other data supplied by said packet switch.

* * * * *